United States Patent
Ward

(10) Patent No.: US 10,196,293 B2
(45) Date of Patent: Feb. 5, 2019

(54) PROCEDURE FOR STABILIZING HIGH PH LEVELS IN BIOSOLIDS-CONTAINING PROCESSED SEWAGE PRODUCT

(71) Applicant: LYSTEK INTERNATIONAL INC., Cambridge (CA)

(72) Inventor: Owen Patrick Ward, Waterloo (CA)

(73) Assignee: Lystek International, Inc., Cambridge, Ontario (CA)

(*) Notice: Subject to any disclaimer, the term of this patent is extended or adjusted under 35 U.S.C. 154(b) by 409 days.

(21) Appl. No.: 15/180,721

(22) Filed: Jun. 13, 2016

(65) Prior Publication Data

US 2016/0362323 A1  Dec. 15, 2016

(30) Foreign Application Priority Data

Jun. 11, 2015 (GB) .................................. 1510219.7

(51) Int. Cl.
| | |
|---|---|
| *C02F 1/02* | (2006.01) |
| *C02F 1/66* | (2006.01) |
| *C02F 11/14* | (2006.01) |
| *C02F 11/18* | (2006.01) |
| *C05F 7/00* | (2006.01) |

(52) U.S. Cl.
CPC .............. *C02F 11/14* (2013.01); *C02F 11/18* (2013.01); *C05F 7/00* (2013.01); *C02F 1/025* (2013.01); *C02F 1/66* (2013.01); *C02F 2303/06* (2013.01); *Y02A 40/213* (2018.01); *Y02E 50/343* (2013.01); *Y02W 30/47* (2015.05)

(58) Field of Classification Search
CPC .. C02F 1/025; C02F 1/66; C02F 11/14; C02F 11/18; C02F 2303/06; C05F 7/00; Y02A 40/213; Y02E 50/343; Y02W 30/47
See application file for complete search history.

(56) References Cited

U.S. PATENT DOCUMENTS

| | | | |
|---|---|---|---|
| 6,808,636 B2* | 10/2004 | Ward ...................... | C02F 11/18 210/710 |
| 2008/0223793 A1* | 9/2008 | Lee ......................... | C02F 11/18 210/749 |
| 2012/0240647 A1* | 9/2012 | Montemurro ............. | C02F 1/66 71/12 |

* cited by examiner

*Primary Examiner* — Lucas A Stelling
(74) *Attorney, Agent, or Firm* — Anthony Asquith Corp.

(57) ABSTRACT

In accordance with one aspect of the invention a testing procedure, a processing procedure and a resulting product are provided whereby sewage sludge is primarily or firstly pre-hydrolyzed in whole or in part by means other than alkali. The alkali is then added to the pre-hydrolyzed product. The pre-hydrolyzed product from step one has a reduced potential for further hydrolysis and is more effectively stabilized in step 2 as a liquid biosolids-containing product or BSP. As a result, in accordance with the invention less of the alkali is used up in the step 2 further alkali-based hydrolysis of the pre-hydrolyzed product. The pH of the BSP product after the step 2 alkali treatment drops less over the period of storage and the BSP product will be better preserved against microbial regrowth.

45 Claims, No Drawings

PROCEDURE FOR STABILIZING HIGH PH LEVELS IN BIOSOLIDS-CONTAINING PROCESSED SEWAGE PRODUCT

PRIORITY PARAGRAPH

This application claims the benefits of GB Provisional Patent Application #151029.7, filed Jun. 11, 2015, all of which is included herewith by reference.

BACKGROUND

Alkali has been long used as a method for stabilization of biosolids. USEPA recommends holding biosolids for a period of time at a pH of 12 or greater as a method for production of stabilized biosolids. Disadvantages of this method include high volumes and high costs of the alkali required to achieve this high pH, the increased emission of ammonia from the biosolids at the higher pH values and limitations on the amounts of high alkali-containing biosolids that may be applied as fertilizer to soils.

Biosolids coming from the wastewater treatment plant typically contains substantial populations of microorganisms including pathogens and one motivation for using alkali to increase the pH is to partially or preferably completely kill these organisms.

The alkali component of the biosolids sludge additionally, and very importantly, acts to preserve the biosolids product by totally preventing or reducing the potential for regrowth of microorganisms in the product.

A principal way in which alkali is used up in biosolids is through hydrolysis.

The prior art shows that to achieve long term stability and, thus long term stability of the pH, while stored of the resulting BSP requires both large amounts of expensive alkali and large amounts of heat applied over an extended period.

With respect to hydrolysis of bio materials it has been said that:

Alkaline hydrolysis is a simple, natural process by which complex molecules are broken down into their constituent building blocks by the insertion of ions of water (H2O), H+, and OH– between the atoms of the bonds that held those building bocks together. The process occurs in nature when animal tissues and carcasses are buried in soil of neutral or alkaline pH. In this case, alkaline hydrolysis is aided by the digestive processes of soil organisms. Alkaline hydrolysis also occurs in our small intestines after we eat; the complex molecules of proteins, fats, and nucleic acids are hydrolyzed with the aid of digestive enzymes that function most efficiently at a slightly alkaline pH (~pH8.0 to 8.5) . . . .

Chemistry of the Process

Hydrolysis can be catalyzed by enzymes, metal salts, acids, or bases. Bases are typically water solutions of alkali metal hydroxides such as sodium hydroxide (NaOH) or potassium hydroxide (KOH). Heating the reactants dramatically accelerates hydrolysis. Just as proteins, nucleic acids, polymeric carbohydrates, and lipids were made by organisms via the condensation of building blocks, so can they be depolymerized, or unmade, by hydrolysis.

. . . All proteins, regardless of their origin, are destroyed by alkaline hydrolysis . . . .

Effects of Alkaline Hydrolysis on:

Proteins

Alkaline hydrolysis leads to the random breaking of nearly 40% of all peptide bonds in proteins, the major solid constituent of animal cells and tissues.

Lipids

Simple fats consist of three fatty acid chains bound through ester bonds to a molecule of glycerol. During alkaline hydrolysis, all of these ester bonds, as well as the sterol esters and phospholipids of cell secretions and cell membranes, hydrolyze with the consumption of the alkali, producing the sodium and potassium salts of fatty acids, namely soaps . . . .

Carbohydrates

As a group of polymers, carbohydrates are the constituents of cells and tissues most slowly affected by alkaline hydrolysis. Both glycogen, the most common large polymer of glucose in animals, and starch, the most common large polymer of glucose in plants, are immediately solubilized. However, the breakdown of these polymers requires much longer treatment than is required for large intracellular and extracellular polymers. Some large carbohydrate molecules, the þ 1-4)-linked glycans, such as cellulose, are quite resistant to alkaline hydrolysis, as they are to digestion in the human intestine. On the other hand, cellulosic materials usually occur only in the digestive tracts of grazing animals where, as a rule, they have been macerated and partially digested. Consequently, further degradation, even if slow, usually does not pose a problem . . . . All monosaccharides (simple sugars), such as glucose, galactose, and mannose, are rapidly destroyed by the hot aqueous alkaline solution.

Nucleic Acids

Nucleic acids are large, unbranched, linear polymers held together by phosphodiester bonds, which are similar to the simpler ester bonds of fats but include a phosphate group as part of the bond structure. These ester bonds are also hydrolyzed with consumption of the alkali, rapidly destroying ribonucleic acid (RNA) and more slowly destroying deoxyribonucleic acid (DNA).

Applications of the Alkaline Hydrolysis Process

In addition to its utility for the disposal of routinely generated animal tissues and carcasses, alkaline hydrolysis is particularly useful for the disposal of many difficult-to-handle biologic and biohazardous wastes . . . .

Resource Recycling Versus Waste Disposal

One truly noteworthy point is that while the animal tissues and carcasses may be called "wastes," the sterile hydrolyzate produced from them by alkaline hydrolysis is no longer a waste but a resource. This undiluted hydrolyzate, a 5%-7% solution of amino acids, small peptides, sugars, soaps, and electrolytes, is a valuable and versatile nutrient source that can be used as fertilizer, either liquid or dried and solid, as an additive to composting systems, or as a feedstock for anaerobic digestion biogas generation plants that produce methane, steam, heat, and electric power. Biodiesel applications for the hydrolyzate are also being actively explored.

Conclusion

We have attempted in this article to illustrate the versatility of alkaline hydrolysis as a process for treatment and disposal of a variety of biologic, biohazardous, and hazardous wastes in a manner that is nonpolluting, more efficient and economical than incineration, and capable of producing secondary beneficial resources. We are certain that as we learn even more about this process, its applications will continue to increase in medical and veterinary research, clinical practice, and education, as well as in other industries that produce significant amounts of biologic waste, and that it will become the standard method for treating such wastes rather than being considered an alternative method to combustion of incineration.

From this it is apparent that many persons skilled in the art, PSITAs believe that high-heat pH-12 hydrolysis (herein HHpH12 hydrolysis) provides a complete and useful process for the processing of sewage waste into a useful resource. As shown above, many PSITAsbelieve that the overwhelming action of the HHpH12 hydrolysis is a necessary feature when processing ordinary sewage sludge.

Time has shown that this belief leads inevitably to large energy consumption, large scale pressure vessel equipment, and large amounts of the alkali of choice. Namely a costly and time consuming process to set up and carry out over the long periods of production time required for, say, municipal sewage treatment.

Efforts continue to provide an improved useful and acceptable resource from sewage waste without these costs and limitations.

Many have applied the term thermal hydrolysis to this HHpH12 process and it is sometimes defined as:

Thermal hydrolysis is a process used for treating industrial waste, municipal solid waste and sewage.

Description

Thermal hydrolysis is a two-stage process combining high-pressure boiling of waste or sludge followed by a rapid decompression. This combined action sterilizes the sludge and makes it more biodegradable, which improves digestion performance. Sterilization destroys pathogens in the sludge resulting in it exceeding the stringent requirements for land application (agriculture).[1]

In addition, the treatment adjusts the rheology to such an extent that loading rates to sludge anaerobic digesters can be doubled, and also dewaterability of the sludge is significantly improved.

See https://en.wikipedia.org/wiki/Thermal_hydrolysis

Again, this demonstrates a thorough processing to a sterilized state.

Further, for instance:

U.S. Pat. No. 6,808,636 describes a process whereby an alkali-treated sewage sludge is heated to a temperature less than 100 degrees Celsius and sheared to reduce the viscosity of the sludge, and U.S. Pat. No. 5,618,442 provides a process and apparatus for treating sewage sludge having the steps of providing sludge at a desired rate, mixing the sludge with at least one alkaline additive at a proportionate rate to the sludge to raise the pH of the mixture to at least a desired level, providing a pasteurization chamber having a means to heat the contents of the chamber, continuously delivering the sludge and alkaline additive mixture to the inlet opening of the pasteurization chamber, heating the pasteurization chamber to maintain a minimum temperature of the sludge and alkaline additive mixture in the pasteurization chamber.

Of note with respect of US'442 is that pasteurization is often defined as an incomplete sterilization with an operative temperature of about 70 degrees Celsius. Common teaching is that higher temperatures are counter-productive to the process and the ultimate end product as they tend to go too far.

An example of a definition of pasteurization which is commonly understood is as follows:

pasteurization

Simple Definition of pasteurization —: a process in which a liquid (such as milk or cream) is heated to a temperature that kills harmful germs and then cooled quickly.

Source: Merriam-Webster's Learner's Dictionary

Full Definition of pasteurization—: partial sterilization of a substance and especially a liquid (as milk) at a temperature and for a period of exposure that destroys objectionable organisms without major chemical alteration of the substance.

See http://www.merriam-webster.com/dictionary/pasteurization

Pasteurization is thus specifically designed to be incomplete while HhpH is designed with the opposite in mind, i.e. complete to the nth degree.

In these examples of the prior art processes, the use of alkali corresponds with the kind of teaching form the quotations above, ie a heat/alkali combination to break down the complex and uncertain chemistry of active sewage waste. Inevitably, the amount of alkali used is very high, and, thus, the cost of the process is high due to the high cost of the chemical itself.

It is also widely known that the pH of alkaline biosolids sludge drifts downwards over time. This may be explained as follows:

Alkali is well known to promote hydrolysis of organic molecules, including the polysaccharides, proteins and lipids that are considerable components of biosolids. In many hydrolysis reactions the alkali actually participates in and is used up in the hydrolysis reaction.

And since a portion of the total alkali is used up in this way the pH of the remaining sludge becomes reduced. Reduced pH known to be counter productive to the long term stability and storage of the resulting BSP in many cases.

Objects

It is an object of the invention to provide a testing procedure, an industrial process and a BSP product, wherein the rate of utilization of alkali added is reduced, while maintaining a higher and stable pH in the biosolids result.

It is a further object to better preserve the BSP product by reduction of the potential for microbial regrowth to the extent necessary for particular product uses.

It is a still further object to produce a fertilizer product with a greater consistency in the product by reducing its variability with respect to product alkalinity or pH over the period of storage.

It is yet a still further object to provide a procedure to limit the use of alkali in creation of a stable BSP.

The Invention

In accordance with one aspect of the invention a testing procedure, an industrial process and a resulting product are provided whereby sewage sludge is primarily or firstly pre-hydrolysed in whole or in part by means other than alkali. The alkali is then added to the pre-hydrolysed product. The pre-hydrolysed product from step one has a reduced potential for further or continuing hydrolysis and is more effectively stabilized in step 2 as a liquid BSP.

As a result, less of the alkali will be used up in the step 2 further hydrolysis of the pre-hydrolysed product. Consequently, in situations where the amount of alkali is to be reduced from full sterilization or HHpH12 levels, the pH of the BSP product after the step 2 alkali treatment will remain at a higher or sufficiently high level, drop less during storage periods applicable to particular uses and the BSP product will be better preserved against microbial regrowth.

In a preferred embodiment the pre-hydrolysis first step includes thermal hydrolysis and a period of process time at Temperature.

In accordance with a further aspect of the invention a procedure is provided for reducing usage of alkali materials while maintaining and stabilizing sufficiently high pH levels in biosolids-containing product, referred to as BSP in this application, produced from a sewage sludge having a solids content of 10% or more by:

(a) firstly, commencing a first pre-hydrolysing step in the sewage sludge, in whole or in part by means other than alkali, to produce an extended hydrolysis reduction of complex chemicals components of the sludge, and (b) then, secondly, adding an alkaline hydrolysis agent thereby raising the pH of the sludge and commencing a $2^{nd}$ hydrolysis reaction but in an amount insufficient to maintain that pH in the BSP over long term storage in the absence of step one of the procedure, and, (c) providing a timing separation between said commencement of the pre-hydrolysing step and the said adding of said alkaline agent so as to permit the pre-hydrolysis step to continue without high alkali levels and to reduce or eliminate long term degradation of the pH levels in the BSP in storage, and (d) storing the stabilized BSP for a period of time.

Further, the first pre-hydrolysing step may be maintained over a first period and primarily or firstly pre-hydrolyse the sewage sludge in whole or in part.

Further, the first pre-hydrolysing step may include a thermal heating step and an optional cooling to/from either 60-80 or 80-125 degrees Celsius to ambient.

In another aspect the invention provides a procedure including a shearing step before the addition of the alkaline hydrolysis agent of step 2.

THE PREFERRED EMBODIMENTS

In a preferred embodiment the pre-hydrolysis first step includes a period of thermal hydrolysis in the absence of alkali.

The preferred embodiment is illustrated by reference to the Examples. In these examples the effects on the low pH of the procedure of the preferred embodiment were compared with the results of identical levels of applied alkali wherein the heating is combined with the alkai addition as taught by the prior art:

(a) where the biosolids, to which alkali has been added, is heated and held at a high temperature [combined thermal/alkali hydrolysis],
with a process,
(b) where the biosolids is first heated and held at high temperature, followed by a second step of alkali treatment.

Example 1

(a) Combined thermal/alkali hydrolysis:

Specific amounts of the alkali Cal85 (a product name supplied by Carmeuse, Beachville, Ontario) were mixed into a BSP with 15% biosolids. The mixture was heated to 121 degrees C. in an autoclave and held for 60 min. When the temperature dropped below 100 degrees C. the product was remixed and stored.

(b) Thermal hydrolysis, first step, followed by alkali treatment, second step:

The same BSP with 15% Biosolids was heated to 121 degrees C. and held for 60 min as a first step. When the temperature dropped below 100 degrees C. the same specific amounts [as in (a)] of Cal85 were then added to the biosolids BSP as a second step and the mixture was stirred/sheared in a kitchen blender for 2-3 minutes and then stored.

Table 1. Comparison of effects on biosolids hydrolysis processes on BDP product pH:

TABLE 1

Comparison of effect of biosolids hydrolysis process on product pH. Temperature/time hold; 121 C./60 min.

| Alkali added: *cal85 kg/mt 15% biosolids | (a) Combined thermal/alkali hydrolysis: | | | b) Thermal hydrolysis followed by alkali treatment: | | | $pH_{0d}(b)$ minus $pH_{0d}(a)$ pH units |
|---|---|---|---|---|---|---|---|
| | $pH_{0d}$ | $pH_{7d}$ | $pHh_{30d}$ | $pH_{0d}$ | $pH_{7d}$ | $pH_{30d}$ | |
| 7.16 | 8.9 | 8.3 | 7.4 | 9.8 | 9.8 | 9.8 | 0.9 |
| 10.7 | 9.0 | 8.0 | 7.3 | 11.0 | 10.6 | 10.6 | 2.0 |
| 14.3 | 9.4 | 9.3 | 9.2 | 11.5 | 10.9 | 11.0 | 2.1 |
| 17.9 | 10.7 | 10.1 | 10.1 | 12.2 | 12.0 | 12.0 | 1.5 |
| Average pH drop over 30 days in pH units | | 1.0 | | | 0.3 | | Avg 1.6 |

The pH figures provided in Table 1 are identified by the number of storage days at the time of the test. Thus, pHsub7d is the measured pH at day 7 of the storage cycle.

With treatment (a) {the combined process} the initial pH at day 0 was lower and the resultant BSP pH drops were higher over a 7 and 30 day storage period.

Results summary for the preferred embodiment procedure of the invention in Example 1 where the first step thermal hold was 121 degrees C./60 min:

1. The average initial pH (pHOd) of BSP product treated by the thermal hydrolysis first step followed by the second alkali step (as in b) was 1.6 units higher than the corresponding value for the combined thermal/alkali treatment (as in a).

2. Furthermore, the average pH drop over a 30 days storage period was 1.0 for the combined thermal alkali treatment but <0.3 for thermal hydrolysis followed by alkali treatment of the preferred embodiment.

3. Process is effective with low cost alkali such as Cal85.

4. In the preferred embodiment treatment (b) shearing is not required in the thermal hydrolysis first step and only limited shearing 2-3 minutes was used for the alkali mixing in second treatment step.

Example 2

The testing of Example 1 was repeated with treatments the same except the temperature/time hold conditions between the commencement of the first heating step and the second alkali step of the preferred embodiment were 100 degrees C./180 min. Results are presented in Table 2.

TABLE 2

Comparison of effect of biosolids hydrolysis process on product pH.
Temperature/time hold; 100 C./180 min.

| Alkali added: *cal85 kg/mt 15% biosolids | (a) Combined thermal/alkali hydrolysis: | | | b) Thermal hydrolysis followed by alkali treatment: | | | $pH_{0d}$(b) minus $pH_{0d}$(a) pH units |
|---|---|---|---|---|---|---|---|
| | $pH_{0d}$ | $pH_{7d}$ | $pHh_{30d}$ | $pH_{0d}$ | $pH_{7d}$ | $pH_{30d}$ | |
| 7.16 | 8.8 | 8.0 | 7.8 | 10 | 10 | 9.6 | 1.2 |
| 10.7 | 9.2 | 9.0 | 8.3 | 10.9 | 10.8 | 10.4 | 1.7 |
| 14.3 | 9.6 | 9.5 | 9.0 | 11.5 | 11.4 | 10.8 | 1.9 |
| 17.9 | 10.5 | 10.5 | 10.1 | 12.4 | 12.3 | 11.7 | 1.9 |
| Average pH drop over 30 days in pH units | 0.73 | | | 0.53 | | | Avg 1.7 |

The pH patterns observed were similar to and quite consistent with those indicated in Example 1.

Results summary for the preferred embodiment procedure of the invention in Example 1 where the first step thermal hold was 100 degrees C./180 min:
1. The average pH (PhOD) of BSP products treated by thermal hydrolysis followed by alkali (as in b) was 1.7 units higher on average than the corresponding value for the combined thermal/alkali treatment (as in a).
2. Furthermore, average pH drop over 30 days was higher (0.73) for the combined thermal alkali treatment as compared with thermal hydrolysis followed by alkali treatment (0.53) of the preferred embodiment.

Example 3

The thermal hydrolysis followed by alkali treatment (as in b) of the preferred embodiment shown Examples 1 and 2 was repeated except the temperature/time hold conditions of the first step were 95 degrees C./for 60 min.
Results are presented in Table 3.

TABLE 3

Effects of thermal hydrolysis at 95 C. for 60 min followed by alkali treatment on product pH.

| Alkali added: *Cal85 kg/mt 15% biosolids | $pH_{0d}$ | $pH_{7d}$ | $pH_{30d}$ |
|---|---|---|---|
| 7.16 | 9.7 | 9.0 | 8.0 |
| 10.7 | 10.7 | 9.7 | 8.8 |
| 14.3 | 11.0 | 10.4 | 9.9 |
| 17.9 | 12.1 | 11.5 | 10.6 |

Table 4 indicates how alkali (Cal85) dose rates used in the experiments correspond to dose rates calculated as Kg calcium oxide (CaO) per metric ton dry biosolids.

TABLE 4

Comparison of equivalent alkali dose rates in different units

| Cal85 kg/mt 15% biosolids | Ca0-kg/dry biosolids |
|---|---|
| 7.16 | 40.6 |
| 10.7 | 60.6 |
| 14.3 | 81.0 |
| 17.9 | 101 |

Example 4

The thermal hydrolysis first step followed by a second step of alkali treatment of the preferred embodiment shown in Example 1b was repeated with treatments the same except undiluted cake was thermally treated at 121 degrees C. for 60 min. After the temperature dropped below 100 degrees C., the product was diluted to 15% biosolids and alkali treated as a second step. Table 5 compares the pH patterns from this set (thermally treated 24% cake) with the corresponding data from Table 1 (thermally treated 15% biosolids). Similar pH patterns were observed after processing and during storage.

TABLE 5

Comparison of the effect on product pH of thermal hydrolysis (121 C./60 min) of undiluted biosolids followed by dilution + alkali treatment versus thermal hydrolysis of diluted biosolids followed by alkali treatment

| Alkali added: Ca0 kg/dry mthiosolids | Thermal hydrolysis of 24% biosolids cake followed by biosolids alkali treatment/ dilution to 15% | | | Thermal hydrolysis of 15% biosolids followed by alkali treatment (from Table 1) | | |
|---|---|---|---|---|---|---|
| | $pH_{0d}$ | $pH_{7d}$ | $pH_{30d}$ | $pH_{0d}$ | $pH_{7d}$ | $pH_{30d}$ |
| 40.6 | 10.2 | 9.8 | 9.9 | 9.8 | 9.8 | 9.8 |
| 60.6 | 10.7 | 10.3 | 10.5 | 11.0 | 10.6 | 10.6 |
| 81.0 | 12.0 | 11.1 | 11.2 | 11.5 | 10.9 | 11.0 |
| 101 | 12.4 | 11.6 | 11.7 | 12.2 | 12.0 | 12.0 |

Results Summary:
A comparison of effects of the thermal hydrolysis first step (b) of cake (about 24% biosolids) versus 15% biosolids, on pH patterns of BSP product:
1. Concentration of biosolids, cake v 15% did not affect the pH patterns of the BSP product following alkali treatment.

Example 4

BSP product viscosities after the treatments of Example 4 above were also determined (Table 6). As indicated, with the exception of the thermally treated 15% biosolids+lowest alkali treatment, all product viscosities were reduced to a range from 3700-4900 cps. Thus, thermally treating undiluted cake as a first step with subsequent dilution to 15%, with the associated energy savings, rather than thermally treating 15% biosolids, had no negative effect on viscosity reduction.

TABLE 6

Comparison of the effect on product viscosity of thermal hydrolysis (121 C./60 min) of undiluted biosolids followed by dilution + alkali treatment versus thermal hydrolysis of diluted biosolids followed by alkali treatment

| Alkali added: Ca0 kg/dry mtbiosolids | Thermal hydrolysis of 24% biosolids cake followed by biosolids alkali treatment/ dilution to 15% | | Thermal hydrolysis of 15% biosolids followed by alkali treatment (from Table 1) | |
|---|---|---|---|---|
| | $pH_{0d}$ | Product Viscosity | $pH_{0d}$ | Product Viscosity |
| 40.6 | 10.2 | 4391 | 9.8 | 18000 |
| 60.6 | 10.7 | 4079 | 11.0 | 4709 |

TABLE 6-continued

Comparison of the effect on product viscosity of thermal hydrolysis (121 C./60 min) of undiluted biosolids followed by dilution + alkali treatment versus thermal hydrolysis of diluted biosolids followed by alkali treatment

| Alkali added: | Thermal hydrolysis of 24% biosolids cake followed by biosolids alkali treatment/ dilution to 15% | | Thermal hydrolysis of 15% biosolids followed by alkali treatment (from Table 1) | |
|---|---|---|---|---|
| CaO kg/dry mtbiosolids | $pH_{0d}$ | Product Viscosity | $pH_{0d}$ | Product Viscosity |
| 81.0 | 12.0 | 3749 | 11.5 | 4205 |
| 101 | 12.4 | 4211 | 12.2 | 4901 |

Results Summary:

Comparison of effects of the thermal hydrolysis first step (b) of cake BSP versus 15% biosolids, on viscosity of the BSP product:
1. A thermal hydrolysis first step followed by alkali addition as a second step and 15% biosolids achieved BSP product viscosities of <5000 in the resulting product.
2. A thermal hydrolysis first step for BSP cake followed by dilution to 15% and the alkali addition second step achieved product viscosities of <5000 in the resulting product except for the lowest alkali dose
3. A thermal treatment first step for cake versus 15% biosolids offers significant energy savings.

Another commentary on the present invention will now be presented.

The preliminary thermal hydrolysis operation, done on its own, basically leaves the pH of the sludge unchanged. Then the alkali is added, substantially at ambient temperature. In this second operation, the alkali raises the pH of the sludge. The two operations being separated, the heating operation only hydrolyses the sludge, while adding the alkali raises the pH. Thus, it may be regarded that the two operations do not compromise each other, allowing both to perform their specific tasks to the full.

In the past, one of the aims of systems engineers has been to lower the viscosity of the dewatered sludge. The two operations of (a) adding pH-raising materials to the sludge and (b) heating the sludge, have traditionally been done simultaneously, both together in the one reactor. There is a well-known synergistic interaction between the two operations as to viscosity, in that the magnitude of the reduction of the viscosity, when the two operations are done together, is considerably greater than the sum of the magnitudes of the reductions attributable to the two separate operations.

Another of the traditional aims of the systems engineers, when treating sludge, besides lowering the viscosity, is to raise the pH of the sludge. The pH of the incoming sludge usually is neutral or pH-8. The engineers want the sludge to have a pH of 11, or higher, in order to kill pathogens and for the sludge to resist microbial re-colonization during long-term storage. Also, raised pH is beneficial when the sludge is destined to be disposed of by being spread on farm fields, as a fertilizer.

One problem is that the high pH of the sludge as it enters storage gradually drops off, i.e falls back (towards neutral) during long-term storage. A major reason the sludge pH drops off, during storage, is that naturally-occurring hydrolysis reactions continue in the stored body of sludge, and it is this gradual hydrolysis that lowers the pH. Thus, even though the sludge might have had a highly-effective day.0-pH of e.g pH-11, it is often found that the day.60-pH of that same body of sludge has dropped e.g to an almost-ineffectual pH-9.

This being so, it follows that the body of sludge should have been given a day.0-pH of e.g pH-12, or higher, in order for its day.60-pH still to be above pH-10. One further problem with moving to even higher pH levels is that, even though the natural hydrolysation of the sludge can be characterized as slow and gradual, still the rate of the drop-off of pH is faster at the higher pH levels.

The issue of cost must also be considered, in that securing such high pH levels can be expensive. Thus, the systems engineers wish there were a way of reducing or eliminating the drop-off of pH, during long-term storage of the sludge.

A number of procedural variants for treating dewatered sludge will now be considered, with a discussion of the respective pros and cons.

Procedure.I: Add Alkali to Cold Sludge (No Heat)

Example

Here, the expenditure on resources is basically the cost of adding X kilograms of lime (or other pH-raising agent) per unit mass of sludge, plus the operational cost of mixing that alkali material into the body of sludge (in a reactor vessel). The effect of adding alkali to cold sludge is simply to raise the pH of the cold sludge.

In a particular case, adding the X.kg of alkali is effective to raise the pH of the sludge from neutral to e.g pH-11. The pH level of the body of sludge can be controlled, of course, by adding more or less than X.kg of alkali to the body of sludge. Upon adding alkali to cold sludge, hydrolysis reactions occur naturally (i.e without energy input) continue over the period of long-term storage of the sludge. Typically, if the day.0-pH of the body of sludge (i.e the pH immediately after treatment) is e.g pH-11, it will be found that the day.60-pH of the same body will have fallen to e.g pH-9. At pH-11, the sludge is well-resistant to microbe colonies becoming established in the stored sludge; at pH-9, such resistance is much smaller. If the treatment procedure carried out on the sludge leaves the sludge able to undergo significant natural hydrolysis during long-term storage, such hydrolysis can be expected to cause the mentioned significant reduction in pH, and a corresponding reduction in the ability of the sludge to resist microbe colonization.

Where the main aim of the systems engineers is to leave the sludge in a microbe-free condition at the end of long period of storage, Procedure.I is therefore contra-indicated.

Procedure.II: Heat the Sludge (No Alkali)

Example

Here, heat energy is applied to the body of sewage sludge in the reactor vessel. The temperature is raised to e.g 100° C. an the sludge is incubated at that temperature for e.g four hours. Incubating the body of sludge is effective to promote the hydrolysis reactions that break down large bio-organic molecules in the sludge, which in turn leads to a significant reduction in the viscosity of the sludge—which is advantageous if the major aim is a reduced viscosity. But heating sludge basically is not effective to change the pH of the sludge. Where a major aim is to raise the pH of the sludge, Procedure.II is contra-indicated.

Procedure.III: Add Alkali and Heat the Sludge Simultaneously

Example

As mentioned, this procedure is favoured by systems engineers when they desire to lower the viscosity of the sludge, because of the synergistic effect of the simultaneity as a factor in lowering the viscosity. Adding X.kg of lime expectedly causes the pH of the body of sludge to rise by e.g three pH-units; but simultaneously heating the sludge increases the vigour of the hydrolysation of the sludge, which causes a significant lowering of the pH. The result is that the X.kg of lime now only raises the pH of the sludge by say 1.5 pH-units. Traditionally, when the engineers' major aim has been to lower the viscosity of the sludge, Procedure.III has been the preferred choice, because the resources needed to achieve a given magnitude of viscosity reduction are substantially less than the resources that would be needed to gain a similar magnitude of pH-lowering by either Procedure.I or Procedure.II done separately. However, when the engineers' major aim is not so much to lower the viscosity but rather to raise the pH of the sludge, Procedure.III is wasteful of resources, and is contra-indicated.

Procedure.IV: (1st) Add Alkali to Cold Sludge, and then (2nd) Heat the Sludge

Example

Adding alkali of course raises the pH of the sludge—to the level as dictated by how much alkali is added. Then, the heating operation causes vigorous hydrolysis reactions in the sludge. This uses up some or most of the alkali—and thereby causes a drop-off in the pH of the sludge. When a major aim is to raise the pH of the sludge, wasting the alkali is detrimental, and Procedure.IV is contra-indicated for that reason.

Procedure.V: Add Alkali to Sludge that has been Heated, but has Now Cooled

This is the new procedure that is the subject of the present invention.

Example

Here, the first treatment operation is to incubate the sludge at e.g 90° C. for e.g 5 hours. The resulting thermal hydrolysis is effective to break the bonds of the long-chain organic molecules. The rate and the extent to which the biosolids are hydrolysed depends on the temperature-rise and on the incubation time—and the amount of the expenditure on resources needed to perform the first treatment operation depends on the same things.

After the preliminary incubation has been done, the sludge is allowed to cool down (preferably right down to ambient temperature). The second treatment operation is then performed, in which X.kg of alkali is added (and stirred) into the body of sludge. The amount of added alkali per unit mass of the sludge contributes to the rise in the pH number.

Now, because the sludge has already been hydrolysed, prior to adding the alkali, most or all of the added alkali is available and effective to perform the task of raising the pH number. Because most of the molecules that can be hydrolysed have already been thermally-hydrolysed, any tendency for further hydrolysis, especially that during storage, is much reduced. Thus, once the thermal hydrolysis has been done, less of the later-added alkali is "used up" by further hydrolysis, whereby more of the added alkali is available for the task of raising the pH.

In the new heat-followed-by-pH Procedure.V, the day.0-pH immediately following treatment is considerably higher than, for example, the day.0-pH that results from the other Procedures. The effects of the new heat-followed-by-pH Procedure.V may be compared specifically with the effects of the old heat-and-pH-done-together Procedure.III.

In Procedure.III, X.kg of alkali having been added to the body of sludge, the old day.0-pH is e.g pH-9. When the sludge has been treated by the new heat-followed-by-pH Procedure.V, now the new day.0-pH is e.g pH-11.

A second important effect attributable to the new Procedure.V is that now the measured drop-off of pH during storage, i.e the drop-off from the day.0-pH to the day.60-pH, is considerably lessened, when compared with the corresponding day.0-pH to day.60-pH drop-off encountered in the old Procedure.III. Again, when the sludge has been treated according to the new heat-followed-by-pH Procedure.V, the new pH drop-off during storage is substantially smaller (i.e better) than the corresponding pH drop-off during storage when the sludge had been treated by the old heat-and-pH-done-together Procedure.III.

Summarizing: a beneficial effect of the new heat-followed-by-pH procedure is the significantly higher day.0-pH, and this improvement can be attributed to the fact that, in the old procedure, some or much of the added alkali was used up during the vigorous high-temperature hydrolysis reactions. Therefore, that lost fraction of alkali could not contribute to raising the day.0-pH of the sludge. In the new procedure, the vigorous hydrolysis reactions take place during the initial heating operation, and are preferably (almost) all over and done with, by the time the alkali is added—so now all the added alkali can go towards raising the day.0-pH of the sludge.

The second beneficial effect of the new heat-followed-by-pH Procedure.V is that it is effective to procure a smaller loss or drop-off of pH, between the day.0-pH and the day.60-pH (or whatever other storage time period may be of interest in the particular case) than the old heat-and-pH-done-together Procedure.III.

In the old heat-and-pH-done-together Procedure.III, the vigorous hydrolysis reactions take place at a time when the pH has been raised by the addition of the alkali. Raising the temperature and raising the pH are both known to be effective to increase the vigour of the hydrolysis reactions that break down the large bio-organic molecules. Therefore, the reasonable expectation would be that doing the two operations together (i.e raising temperature and raising pH simultaneously) would likely lead to more vigorous hydrolysis. The more vigorous the hydrolysation, the greater the expectation that the more (and the more quickly) the hydrolysis would use up the sludge's capacity to undergo natural hydrolysis, later, during long-term storage. Thus, PSITAs would reasonably expect that the drop-off of pH (=the difference between the day.0-pH of the treated sludge and the day.60-pH) would be greater (i.e worse) in the new heat-followed-by-pH Procedure.V than in the old heat-and-pH-done-together Procedure.III.

However, the evidence of the attached results is that the drop-off of pH during storage is significantly less (=better) in the new heat-followed-by-pH Procedure.V than in the old heat-and-pH-done-together Procedure.III.

Again, the understandings and expectations are:

(a) that the pH drop-off during long-term storage of sewage sludge can be attributed to gradual natural hydrolysis reactions that break down bio-organic molecules in the stored sludge;

(b) that the hydrolysable molecules that remain in the stored sludge are those that were not hydrolysed during the full sludge treatment procedure;

(c) that the greater the extent and rate of the hydrolysis during treatment, the smaller the amount of remaining hydrolysable molecules that remain in the sludge during storage;

(d) that maximizing the extent and rate of the hydrolysis reactions during the sludge treatment procedure minimizes the extent and rate at which the gradual natural hydrolysis occurs during storage;

(e) that the extent and rate of the sludge hydrolysis that occurs during the old heat-and-pH-done-together Procedure.III will, because of the known synergy of the two operations when done simultaneously, far exceed the extent and rate of the sludge hydrolysis that occurs during the new heat-followed-by-pH Procedure.V.

(f) that the more hydrolysis that is engineered during treatment, the less hydrolysis that can occur during storage;

(g) that the pH drop-off during storage of the new heat-followed-by-pH Procedure.V-treated sludge will be large (=bad), while the pH drop-off during storage of the old heat-and-pH-done-together Procedure.III-treated sludge will be small (=good).

Again, the evidence of the attached results contrasts with the expectation; in reality, the pH drop-off during storage of sludge that has been treated by the new heat-followed-by-pH Procedure.V is relatively small (=good), while the pH drop-off during storage of sludge treated by the old Procedure.III is relatively large (=bad). Doing the heat operation and the pH operation simultaneously would be expected—because of the known synergy that arises when those two operations are done simultaneously—to doubly energize the hydrolysis reactions in the sludge. However, the test results show that doing these two operations simultaneously appears rather to inhibit the hydrolysis reactions in the sludge during the treatment operation—because there is apparently still much capacity for hydrolysis left in the sludge treated according to old Procedure.III.

Typically, sludge that is created late in the year, and is destined to be spread on farm fields as fertilizer, has to be stored during the winter months. Thus, storage for about six months is common—but storage for longer and shorter periods is common too. Another problem is that it can happen that a storage period planned for e.g four months turns out to be e.g eight months—and it can be more expensive to return sludge to the treatment station to have its pH re-raised, than it was to raise its pH during initial processing. So the prudent systems engineers are motivated to add an extra margin of pH to the stored sludge.

The extra resources needed for the preliminary hydrolysis operation are, compared with the cost of raising the pH ever higher, are quite modest, and yet adding the operation significantly increases the period of stable pH to a significant degree, and thereby procures a very worthwhile cost-saving.

The preliminary hydrolysis treatment operation preferably involves simply heating the sludge. Again, it is important to avoid adding alkali into the body of sludge until after the hydrolysis operation is completed. Typically, hydrolysis can be procured by raising the sludge to more than 60° C., and preferably more than 90° C. As a generality, the hotter the sludge the greater the rate at which the hydrolysis reactions are completed. The optimum temperature level is influenced by the economics of the treatment operation, and may depend on the available plant and equipment, the cost of heat energy, the content of the particular sludge, and so on.

The heating operation can be regarded as incubation in that the sludge, having been brought up to e.g 90° C. (i.e substantially the whole body of sludge is at that temperature), should be held at the hot temperature for a period of e.g several hours, in order for the hydrolysis reactions to be completed, or nearly completed. The general rule is that the longer the incubation period, the more the hydrolysable molecules are hydrolysed, and the fewer the remaining hydrolysable-but-unhydrolysed molecules that are available to be hydrolysed during the storage period.

Other ways of procuring the preliminary hydrolysis reactions in the body of sludge may be used, as an alternative to heating the sludge. For example, designers might prefer enzymatic hydrolysis as an alternative or supplement to thermal hydrolysis. Again, the preliminary hydrolysis preferably should not include raising the pH of the sludge.

A key aspect of the present invention lies in the recognition that subjecting the sludge to preliminary hydrolysis is effective to eliminate or reduce the tendency of sludge to undergo gradual natural hydrolysis during storage. The resulting lack of hydrolysis during storage has the effect of reducing the tendency of the pH of the stored sludge to drift downwards.

A number of benefits accrue from subjecting high-solids sludge to violent shearing. The effects of high-energy shearing are quite different from those of e.g vigorous stirring. Shearing rips open the biological cells, and comminutes the solid components thereof—so much so that the solid components can be regarded as having dissolved into the water of the sludge.

Also, shearing lowers the viscosity of the high-solids sludge, rendering the sludge pumpable, which is advantageous when the sludge is destined to be spread on farm fields. From the standpoint of the present invention, another benefit of shearing is that shearing wipes out existing microbe colonies.

The nutrients in sheared sludge are presented with a high degree of bio-availability—which is desirable in a fertilizer. On the other hand, high bio-availability of nutrients might be considered disadvantageous as far as the sludge's resistance to re-establishment of microbe colonies is concerned. It is recognized that the rate at which the hydrolysis reactions proceed when sheared sludge is heated, is significantly greater than the corresponding rate when unsheared sludge is heated. Thus, the preliminary hydrolysis treatment operation can likely be carried out with greater economy, with sheared sludge. Furthermore, it is advantageous also to shear the sludge during the pH-raising operation, because the alkali salts need to be thoroughly mixed into the sludge, and shearing is far more effective to homogenize the mixture than simple stirring. (Even 15%-solids sludge, upon being sheared, can have a viscous consistency and homogeneity similar to paint.)

Preferably, the preliminary hydrolysis treatment operation and the pH-raising treatment operation are both carried out in one single reactor vessel—which is equipped with a heating facility, and a pH-raising facility. Equipping that same reactor vessel also with a shearing facility enhances the preference. Alternatively, the body of sludge can be moved from vessel to vessel for treatment. Generally the treatment station will have plural reactor vessels.

Incorporating the preliminary hydrolysis treatment operation into the sludge treatment procedure, especially when the procedure also includes violent sharing, enables the economical production of a biosolids sludge product that is highly suitable to be spread on farm fields as a fertilizer. The treated sludge can be stored for many months without spoilage.

The main benefit of the invention is to enable sludge to be stored over long periods without spoilage; there would be little point in incorporating the preliminary hydrolysis treatment operation of the present invention into the sludge treatment procedure, if the sludge is not required to be stored for a long period.

The procedure according to the invention is not limited to sewage processing only in accordance with the examples shown.

I claim:

1. A procedure for providing, maintaining and stabilizing high pH levels in biosolids-containing product, BSP, produced from a sewage sludge having a biosolids concentration of 10% or more by:
   (a) a firstly, commencing and continuing a first pre-hydrolysing step in the sewage sludge, in whole or in part by means other than alkali, to produce an extended hydrolysis reduction of the sludge, and
   (b) then, as a second step, adding an amount of alkaline hydrolysis agent to raise the pH of the sludge in an amount insufficient to maintain the pH in the BSP over long term storage in the absence of the procedure, and,
   (c) providing a timing separation between said commencement of the pre-hydrolysing step and the said adding of said alkaline agent so as to either:
      i. increase initial pH levels in the BSP in storage, or,
      ii. reduce or eliminate the long term rate of reduction of the pH levels in the BSP in storage, or both,
   (d) storing the stabilized BSP for a period of time.

2. A procedure for providing, maintaining and stabilizing high pH levels in biosolids-containing product BSP as claimed in claim 1 wherein the first pre-hydrolysing step is maintained over a first period prior to said addition of alkali.

3. As in claim 2 wherein the first pre-hydrolysing step is continued whereby the sewage sludge is primarily or firstly pre-hydrolysed in whole or in part.

4. As in claim 3 wherein the first pre-hydrolysing step is completed prior to the addition of the alkaline agent.

5. As in claim 4 wherein initial pH is maximized or the long term degradation of the pH is minimized, or both, by the adjustment of one or more of said timing separation, said pre-hydrolysis or the amount of said alkali addition.

6. A procedure for providing, maintaining and stabilizing high pH levels in biosolids-containing product BSP as claimed in claim 2 wherein the first pre-hydrolysing step includes a thermal heating step.

7. As in claim 6 wherein the heating step is maintained over a first period prior to said addition of alkali.

8. As in claim 7 wherein the first pre-hydrolysing step is continued whereby the sewage sludge is primarily or firstly pre-hydrolysed in whole or in part.

9. As in claim 8 wherein the heating step is completed prior to the addition of alkaline hydrolysis agent.

10. As in claim 9 wherein there is no substantial overlap between the heating step and the addition of the alkaline hydrolysis agent.

11. As in claim 10 wherein initial pH is maximized or the long term degradation of the pH is minimized, or both, by the adjustment of one or more of said timing separation, the degree of said pre-hydrolysis or the amount of said alkali addition.

12. As in claim 7 wherein the heating step concludes with a cooling step.

13. As in claim 7 wherein the heating step includes heating the sewage sludge to between either 90 and 100 degrees Celsius or between 100 and 125 degrees Celsius.

14. As in claim 13 wherein the heating step includes a cooling step whereby the sewage sludge is reduced to ambient temperatures prior to the addition of alkali.

15. As in claim 3 wherein the pre-hydrolyzing step includes a shearing step.

16. As in claim 5 wherein the storage period is between 1 day and 12 months.

17. As in claim 14 wherein the pH of the BSP before storage is either at least 9.0 or 9.5.

18. As in claim 14 wherein the pH drop of the BSP product during storage for 1 month is less than either 0.5 or 1.0 pH units.

19. As in claim 5 wherein the amount of alkali added is either 60-80 Kg or 80-100 Kg (as CaO or equivalent from other sources) per dry MT biosolids.

20. As in claim 5 wherein the timing separation is sufficient to prevent microbial regrowth in the BSP product in storage.

21. As in claim 5 wherein the timing separation is sufficient to prevent production of methane in the BSP product in storage.

22. As in claim 4 wherein the sewage sludge is a liquid having a viscosity of about 8000 cps at the time of addition of alkaline hydrolysis agent.

23. As in claim 1, where the biosolids concentration is maintained between 10 and 30% prior to storage.

24. As in claim 23, where the alkali added is between 5-20 kg Cal 85 (85% calcium oxide), or the equivalent amount of alkali from another alkali source, per metric tone at 15% biosolids, or equivalent amount of biosolids at another concentration.

25. As in claim 13, where the temperature is held at less than 125 degrees Celsius and more than 100 degrees Celsius for a period of between 60 and 180 minutes, respectively.

26. As in claim 13, where the temperature is held at less than 100 degrees Celsius for a period of as much as 24 hours.

27. A pH stable biosolids-containing product, BSP, produced from a sewage sludge having a solids content of 10% or more in accordance with the procedure set out in claim 5.

28. A pH stable biosolids-containing product, BSP, produced from a sewage sludge having a solids content of 10% or more in accordance with the procedure set out in claim 10.

29. A pH stable biosolids-containing product, BSP, produced from a sewage sludge having a solids content of 10% or more in accordance with the procedure set out in claim 14.

30. Treatment procedure for inhibiting microbial degradation in a body of sludge during long-term storage, including:
   [2] subjecting the body of sludge to a preliminary hydrolysing treatment operation, and conducting that operation in such manner that substantial hydrolysis reactions take place in the body of sludge;
   [3] then subjecting the body of sludge to a pH-raising treatment operation, which includes adding a substantial mass of a pH-raising agent into the body of sludge;
   [4] then storing the sludge for a long-term storage period of seven days or more.

31. As in claim 30, including conducting the preliminary hydrolysing treatment operation by heating the body of sludge to 60° C. or hotter, or by another process.

32. As in claim 30, wherein:
[2] the operating parameters of the preliminary hydrolysing operation include:
[3] heating the body of sludge to a temperature.T, which is 60° C. or hotter: and
[4] holding the body of sludge at the temperature.T for a time.H, which is 30 minutes to several hours;
[5] the operating parameters of the pH-raising operation include:
[6] adding a mass.M of lime, or other pH-raising material, per unit-mass of the sludge, into the body of sludge.

33. As in claim 30, wherein the degradation of the sludge is:
[2] (a) degradation that occurs gradually during long-term storage of the body of sludge, being a storage period of several days to several months;
[3] (b) bacteriological degradation that arises from the gradual establishment of microbial colonies in the body of sludge associated with a gradual lowering of the pH of the treated sludge, the lowering of the pH being a result of ongoing hydrolysis reactions that take place naturally, during long-term storage, in the body of sludge; and
[4] (c) degradation that can be inhibited by maintaining the pH of the body of sludge at a high level during storage.

34. As in claim 30, wherein the body of sludge comprises sludge that has been dewatered to a solids-content of ten percent or higher.

35. As in claim 32, wherein:
[2] the pH of the body of sludge at the start of storage being day.0-pH, and after 60 days of storage being day.60-pH;
[3] the procedure includes so configuring the operating parameters of the two treatment operations that the difference between the day.0-pH and the day.60-pH is less than one pH-unit.

36. As in claim 30, wherein:
[2] upon completion of the two treatment operations, the pH of the body of sludge at the start of storage is day.0-pH, and after 60 days of storage is day.60-pH;
[3] the difference between the day.0-pH and the day.60-pH is here termed the regular-drop-off;
[4] a parameter here termed NoHyd-day.0-pH is defined in that, if the body of sludge is subjected only to the pH-raising operation, using the same operational parameters, and the preliminary hydrolysing operation is omitted, in that case the pH body of sludge at the start of storage is NoHyd-day.0-pH, and after 60 days of storage is NoHyd-day.60-pH;
[5] the difference between the NoHyd-day.0-pH and the NoHyd-day.60-pH is here termed the NoHyd-drop-off;
[6] the procedure includes so conducting the treatment procedure as a whole that the regular drop-off is substantially smaller than the NoHyd drop-off.

37. As in claim 36, including so conducting the treatment procedure as a whole that the regular-drop-off is less than one half the NoHyd drop-off.

38. As in claim 36, including so conducting the treatment procedure as a whole that:
[2] the day.60-pH is 9.0 or higher
[3] the regular-drop-off is less than 1.0 pH-units.

39. As in claim 36, wherein:
[2] if the body of sludge were to be subjected only to the pH-raising operation, and not to the preliminary hydrolysing operation, in that case:
[3] the NoHyd-day.0-pH would be 10.0 or higher;
[4] the NoHyd-day.60-pH would be 9.0 or lower; and
[5] the NoHyd-drop-off would be 2.0 or more pH-units.

40. As in claim 36, including so conducting the treatment procedure that:
[2] the regular-drop-off is smaller than 1.5;
[3] the NoHyd-drop-off would be larger than 1.5.

41. As in claim 30, including continuing the preliminary hydrolysis treatment operation until the resources needed to continue the operation are outweighed by the decreasing hydrolysis reactions thereby procured.

42. As in claim 30, wherein the preliminary hydrolysing operation is done by heating the body of sludge, and either:
[2] A) there is overlap between the preliminary hydrolysis treatment operation and the pH-raising operation, in that the body of sludge is still at an elevated temperature, from the heating process, at the start of the pH-raising operation; or
[3] B) there is a gap between the preliminary hydrolysis operation and the pH-raising operation, in that the body of sludge has cooled to substantially ambient temperature before the pH-raising operation is commenced.

43. As in claim 30, including subjecting the body of dewatered sludge to energetic shearing:
[2] before or during the preliminary hydrolysis operation; or
[3] between the two operations; or
[4] during or after the subsequent pH-raising operation; or
[5] any combination thereof.

44. A biosolids product (BSP), wherein:
[2] the BSP is derived from municipal sewage sludge that has been subjected to a procedure that embodies claim 30;
[3] the BSP has been in storage, for a period of at least seven days;
[4] the BSP is substantially free of bacteriological contamination;
[5] is so constituted as to be suitable for spreading on farm-fields as a fertilizer.

45. As in claim 44, wherein the BSP is of such low viscosity as to be capable of being pumped onto the farm-fields, basically as a liquid.

* * * * *